(12) United States Patent
Yokoyama et al.

(10) Patent No.: US 11,879,766 B2
(45) Date of Patent: Jan. 23, 2024

(54) DROPLET DISPENSING APPARATUS

(71) Applicant: TOSHIBA TEC KABUSHIKI KAISHA, Tokyo (JP)

(72) Inventors: Shuhei Yokoyama, Mishima Shizuoka (JP); Atsushi Kubota, Sunto Shizuoka (JP); Ryutaro Kusunoki, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 382 days.

(21) Appl. No.: 17/212,097

(22) Filed: Mar. 25, 2021

(65) Prior Publication Data

US 2021/0356315 A1    Nov. 18, 2021

(30) Foreign Application Priority Data

May 15, 2020   (JP) .................................. 2020-086109

(51) Int. Cl.
*G01G 17/06* (2006.01)
*B01L 3/02* (2006.01)

(52) U.S. Cl.
CPC ............ *G01G 17/06* (2013.01); *B01L 3/0293* (2013.01); *B01L 2200/061* (2013.01); *B01L 2300/0663* (2013.01); *B01L 2300/0829* (2013.01); *B01L 2300/10* (2013.01)

(58) Field of Classification Search
CPC . G01G 17/06; B01L 3/0293; B01L 2200/061; B01L 2300/0663; B01L 2300/0829; B01L 2300/10
See application file for complete search history.

(56) References Cited

U.S. PATENT DOCUMENTS

| | | | |
|---|---|---|---|
| 6,858,184 B2 * | 2/2005 | Pelrine .................. | B01L 3/0293 422/65 |
| 7,521,020 B2 * | 4/2009 | Gratzl .................. | B01L 3/0275 436/180 |
| 8,793,849 B1 * | 8/2014 | Bhethanabotla ..... | G01N 29/036 29/25.35 |
| 9,453,787 B2 * | 9/2016 | Foster ................... | B01L 3/0241 |
| 9,782,744 B2 * | 10/2017 | Warner .............. | G01N 33/0047 |
| 9,821,552 B2 | 11/2017 | Yokoyama et al. | |
| 10,059,100 B2 | 8/2018 | Yokoyama et al. | |
| 10,189,254 B2 | 1/2019 | Yokoyama et al. | |
| 10,201,971 B2 | 2/2019 | Yokoyama et al. | |
| 10,241,125 B2 * | 3/2019 | Yokoyama ......... | G01N 35/1002 |

(Continued)

*Primary Examiner* — Timothy L Maust
(74) *Attorney, Agent, or Firm* — Kim & Stewart LLP

(57) ABSTRACT

A droplet dispensing apparatus includes a crystal sensor, a resonance frequency measuring unit, and a controller. The controller is configured to obtain the resonance frequency of the crystal sensor before droplets are discharged from a liquid dropping device, control the liquid dropping device to discharge droplets on to the crystal sensor, and obtain the resonance frequency of the crystal sensor after droplets are discharged from the liquid dropping device. The controller estimates a volatilization amount for the droplets on the crystal sensor based on a temporal change trend in the resonance frequency of the crystal sensor and calculates the total weight of the droplets discharged from the liquid dropping device based on the difference in resonance frequency of the crystal sensor before and after the droplets are discharged and the estimated volatilization amount.

20 Claims, 12 Drawing Sheets

(56) References Cited

U.S. PATENT DOCUMENTS

| | | | |
|---|---|---|---|
| 10,245,584 B2* | 4/2019 | Yokoyama | B01L 3/502 |
| 10,369,562 B2 | 8/2019 | Yokoyama et al. | |
| 10,682,874 B2* | 6/2020 | Yamamoto | B41J 2/2142 |
| 10,717,272 B2 | 7/2020 | Yokoyama et al. | |
| 11,511,300 B2* | 11/2022 | Yokoyama | B01L 3/0293 |
| 2007/0015289 A1* | 1/2007 | Kao | B01L 3/50851 |
| | | | 436/180 |
| 2018/0085757 A1 | 3/2018 | Yokoyama et al. | |
| 2018/0169649 A1 | 6/2018 | Yokoyama et al. | |
| 2018/0272334 A1 | 9/2018 | Higuchi et al. | |
| 2018/0272335 A1 | 9/2018 | Higuchi et al. | |
| 2019/0060933 A1 | 2/2019 | Yokoyama et al. | |
| 2019/0060934 A1 | 2/2019 | Yokoyama et al. | |
| 2019/0060935 A1 | 2/2019 | Yokoyama et al. | |
| 2019/0060936 A1 | 2/2019 | Yokoyama et al. | |
| 2019/0060937 A1 | 2/2019 | Yokoyama et al. | |
| 2019/0184390 A1 | 6/2019 | Yokoyama et al. | |
| 2019/0315122 A1* | 10/2019 | Yokoyama | B41J 2/14032 |
| 2019/0315139 A1 | 10/2019 | Yamamoto et al. | |
| 2020/0047178 A1* | 2/2020 | Yokoyama | B41J 2/14233 |
| 2020/0114669 A1 | 4/2020 | Yamamoto et al. | |
| 2020/0298558 A1 | 9/2020 | Yokoyama et al. | |
| 2021/0156879 A1* | 5/2021 | Limbach | G01N 35/026 |
| 2021/0356315 A1* | 11/2021 | Yokoyama | G01G 17/06 |

\* cited by examiner

DROPLET DISPENSING APPARATUS

CROSS-REFERENCE TO RELATED APPLICATION

This application is based upon and claims the benefit of priority from Japanese Patent Application No. 2020-086109, filed on May 15, 2020 the entire contents of which are incorporated herein by reference.

FIELD

Example embodiments described herein relate to a droplet dispensing device.

BACKGROUND

In research and development in fields such as biology and pharmacy, medical diagnosis and inspection, and agricultural tests, a dispensing of liquid volumes on the order of picoliters (pL) to microliters (μL) may be performed.

These are commonly referred to as dose response experiments, and many solutions having different concentrations are made in containers, such as wells of a microplate, in order to determine the most effective concentration of a compound. A droplet dispensing apparatus is known as a device used for such purposes. The droplet dispensing device discharges a predetermined amount of droplets to a microplate from a detachable liquid dropping device mounted on a liquid discharging apparatus. For example, in a dose response experiment, many types of liquid medicines are used. In medical and biological applications, it is usually required to prevent contamination, and thus a droplet dispensing apparatus may be operated with a liquid dropping device as a disposable device.

After a new liquid dropping device is mounted, the amount of droplets discharged from the liquid dropping device is still required to be a desired target amount. Therefore, a droplet dispensing apparatus is known to measure the weight of droplets discharged from the liquid dropping device by measuring the weight of a microplate.

However, droplets discharged from a liquid dropping device are extremely minute and the total volume dispensed to each target well may be a size on the order of picoliters (pL) to microliters (μL), and thus the weight of the droplets with respect to the weight of the microplate is small. Therefore, it is desired to measure the weight of droplets discharged from the liquid dropping device with higher accuracy.

DETAILED DESCRIPTION

An object of the present disclosure is to provide a droplet dispensing apparatus capable of accurately measuring the amount of droplets discharged from a liquid dropping device.

According to an embodiment, a droplet dispensing apparatus includes a crystal sensor, a vibration voltage generation unit configured to apply a vibration voltage to the crystal sensor, a resonance frequency measuring unit configured to detect a resonance frequency of the crystal sensor, and a controller. The controller is configured to obtain the resonance frequency of the crystal sensor before droplets are discharged from a liquid dropping device, control the liquid dropping device to discharge a liquid as droplets on to the crystal sensor, and obtain the resonance frequency of the crystal sensor on which droplets are adhered after the droplets are discharged from the liquid dropping device. The controller further estimates a volatilization amount for the droplets during a first period of time beginning when the droplets are adhered to the crystal sensor. The volatilization amount is estimated based on a temporal change trend in the resonance frequency of the crystal sensor measured for a second period of time after the first period of time. The controller then calculates a weight of the droplets discharged from the liquid dropping device based on the difference in resonance frequency of the crystal sensor before and after the droplets are discharged and the estimated volatilization amount.

A droplet dispensing apparatus according to a first embodiment discharges a liquid using a piezojet method. The liquid may be referred to as a liquid medicine.

Figure 1:
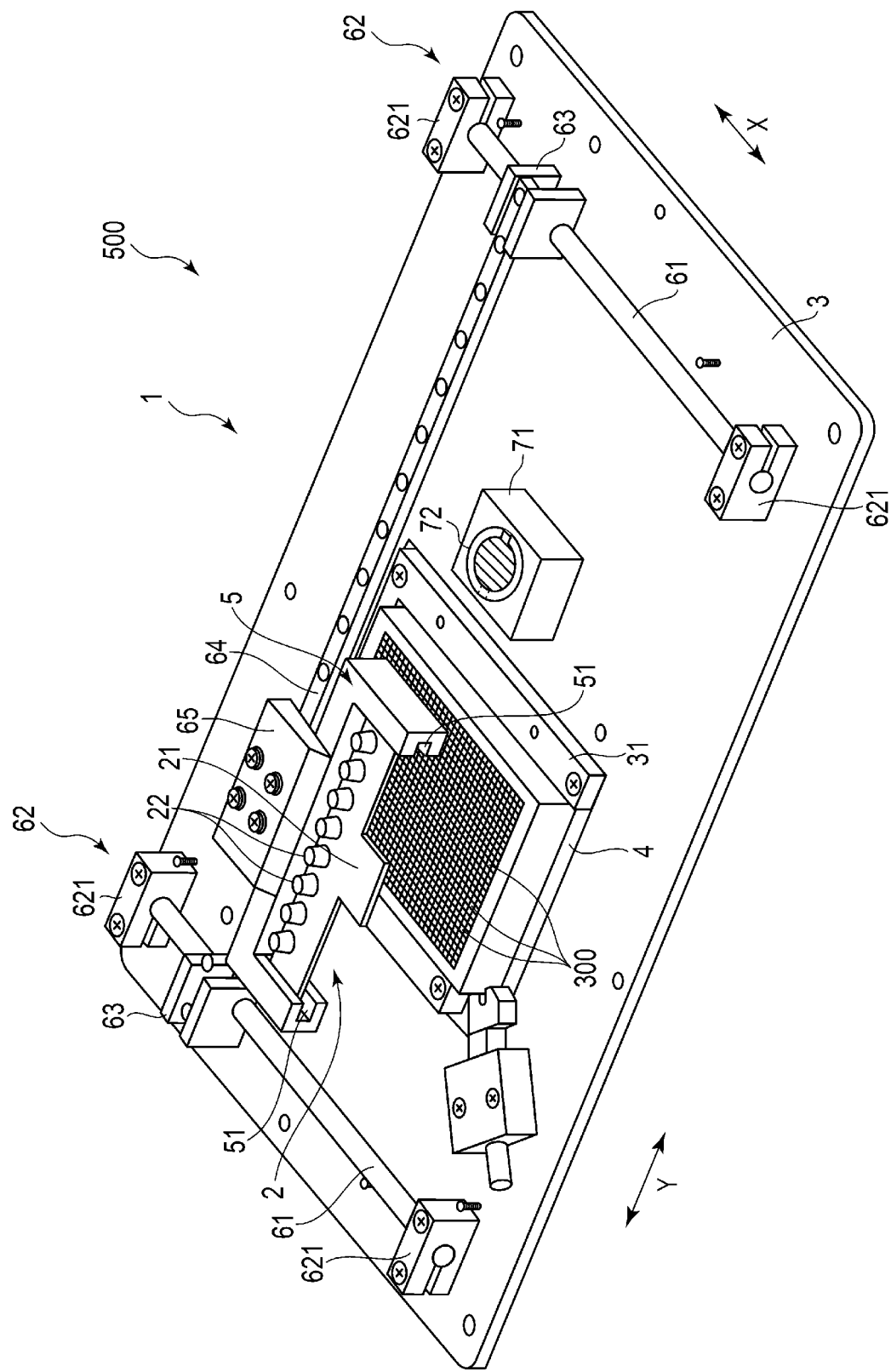
FIG. 1 is a perspective view schematically illustrating a configuration of a droplet dispensing apparatus according to a first embodiment.
Figure 2:
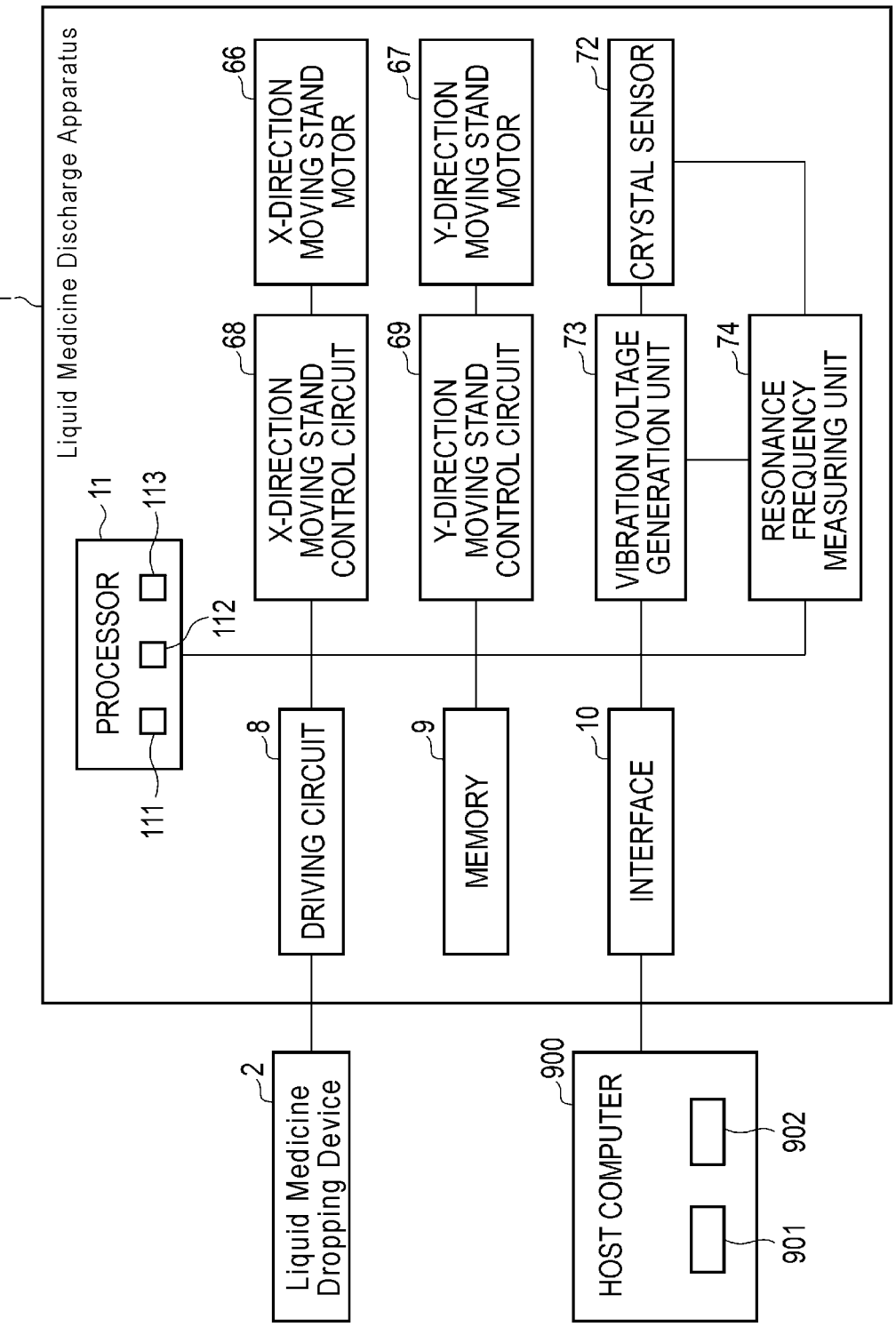
FIG. 2 is a block diagram illustrating a configuration of a droplet dispensing apparatus according to a first embodiment.
Figure 3:
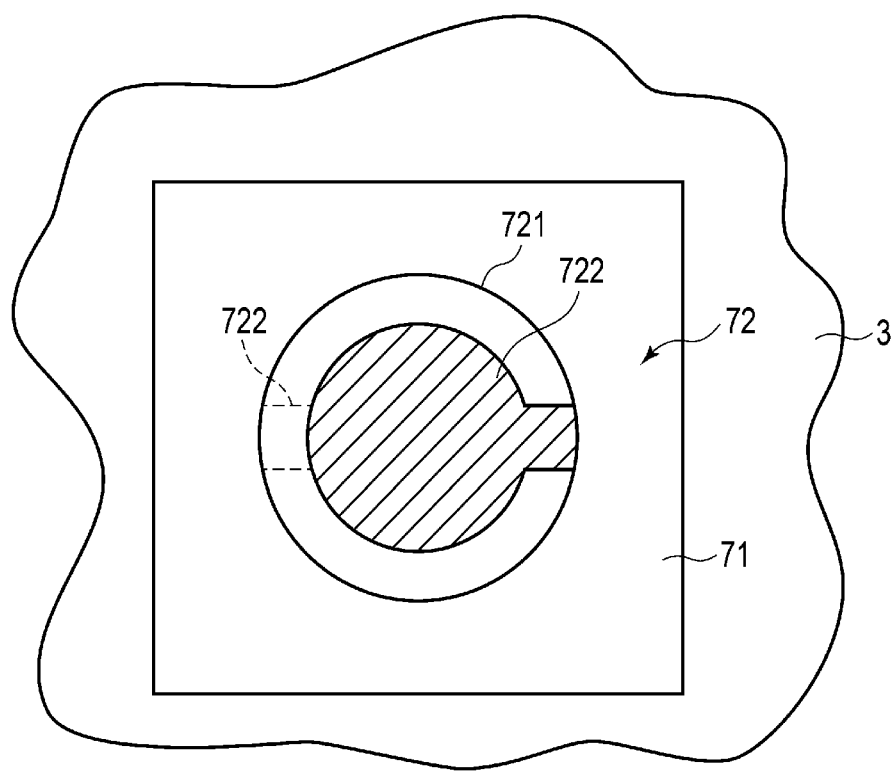
FIG. 3 is a plan view schematically illustrating configurations of a holding portion and a crystal sensor of a quartz crystal microbalance (QCM) device used in a droplet dispensing apparatus according to a first embodiment.
Figure 4:
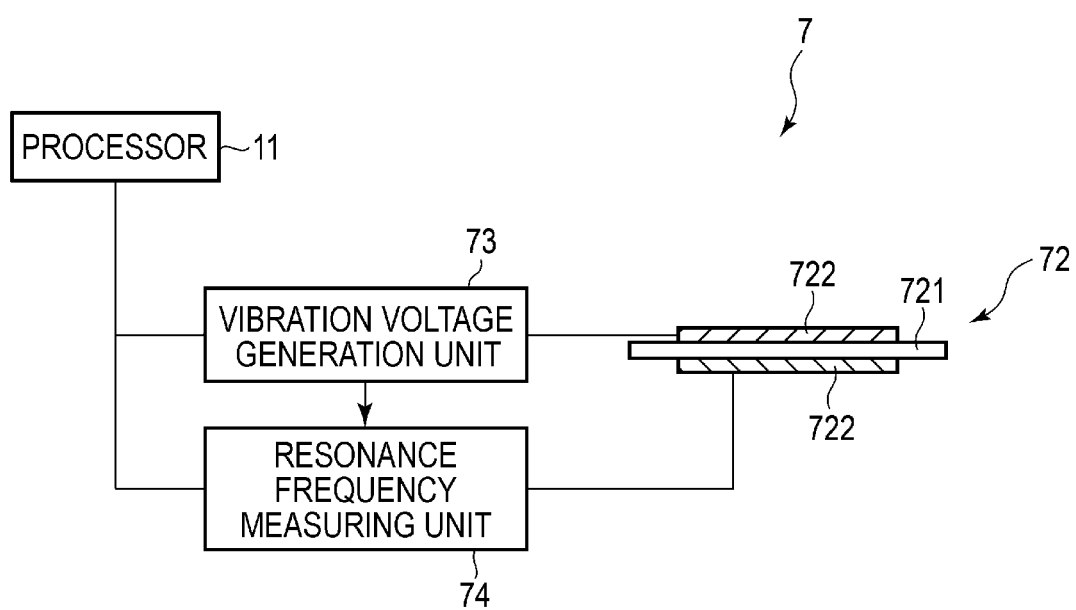
FIG. 4 is a diagram schematically illustrating a configuration of a QCM device.
Figure 5:
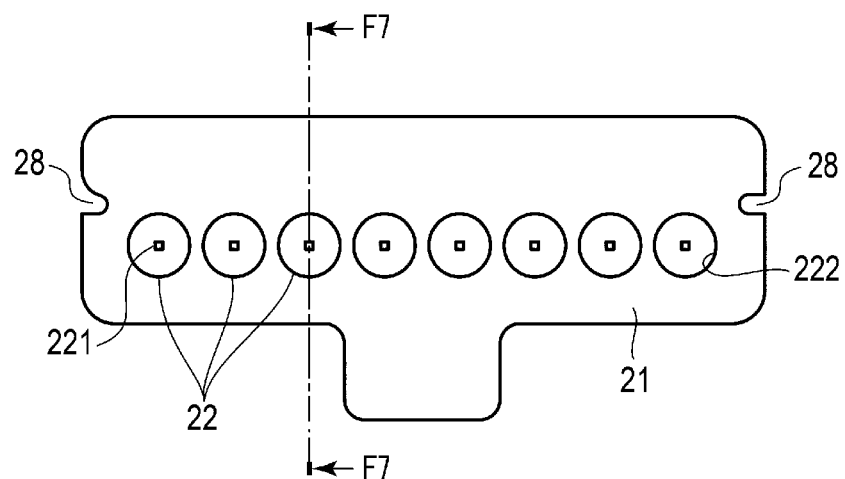
FIG. 5 is a plan view illustrating a configuration of a liquid medicine dropping device used in a droplet dispensing apparatus as seen from a liquid medicine holding container side.
Figure 6:
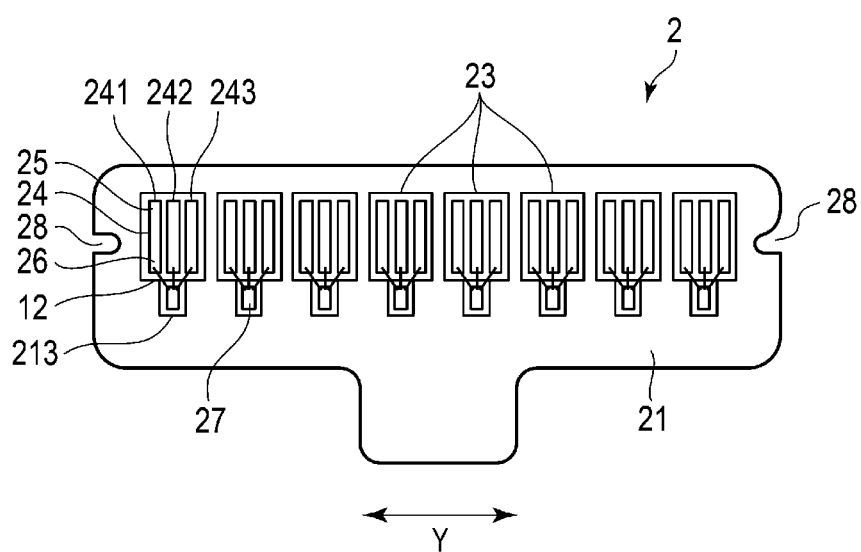
FIG. 6 is a plan view illustrating a configuration of a liquid medicine dropping device as seen from a liquid medicine discharge side.
Figure 7:
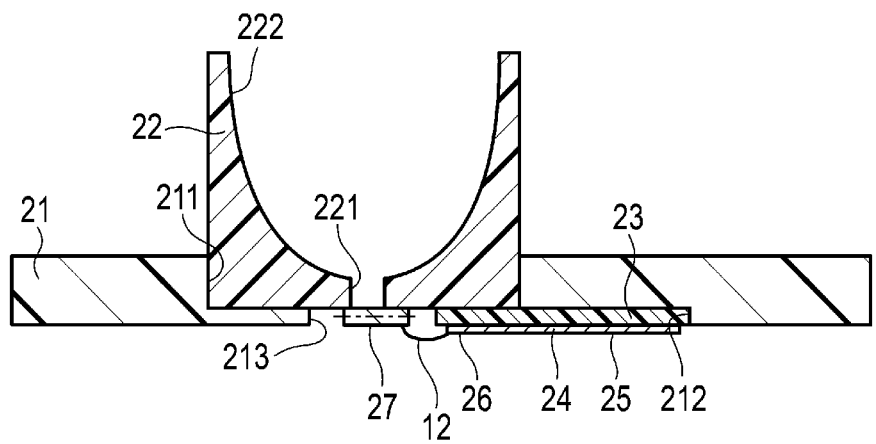
FIG. 7 is a cross-sectional view of a liquid medicine dropping device taken along a line F7-F7 of FIG. 5.
Figure 8:
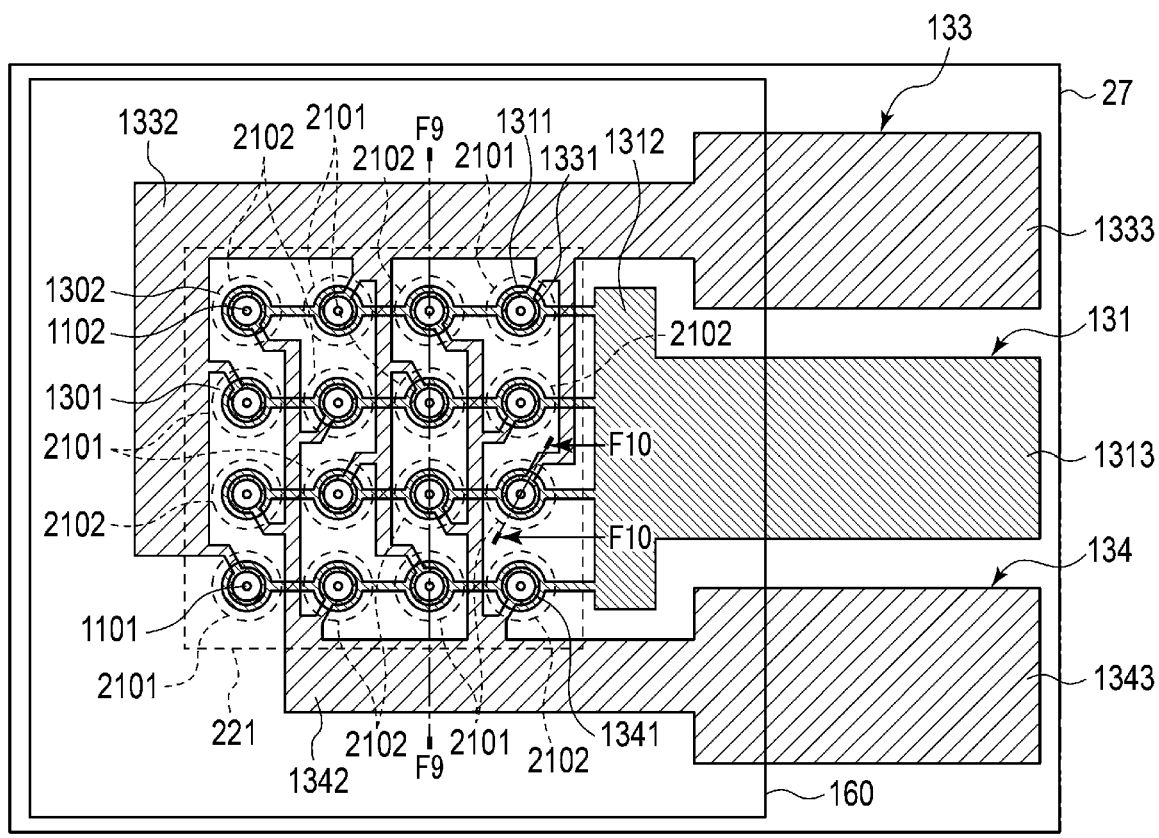
FIG. 8 is a plan view illustrating a configuration of a liquid medicine discharge array of a liquid medicine dropping device as seen from a liquid medicine discharge side.
Figure 9:
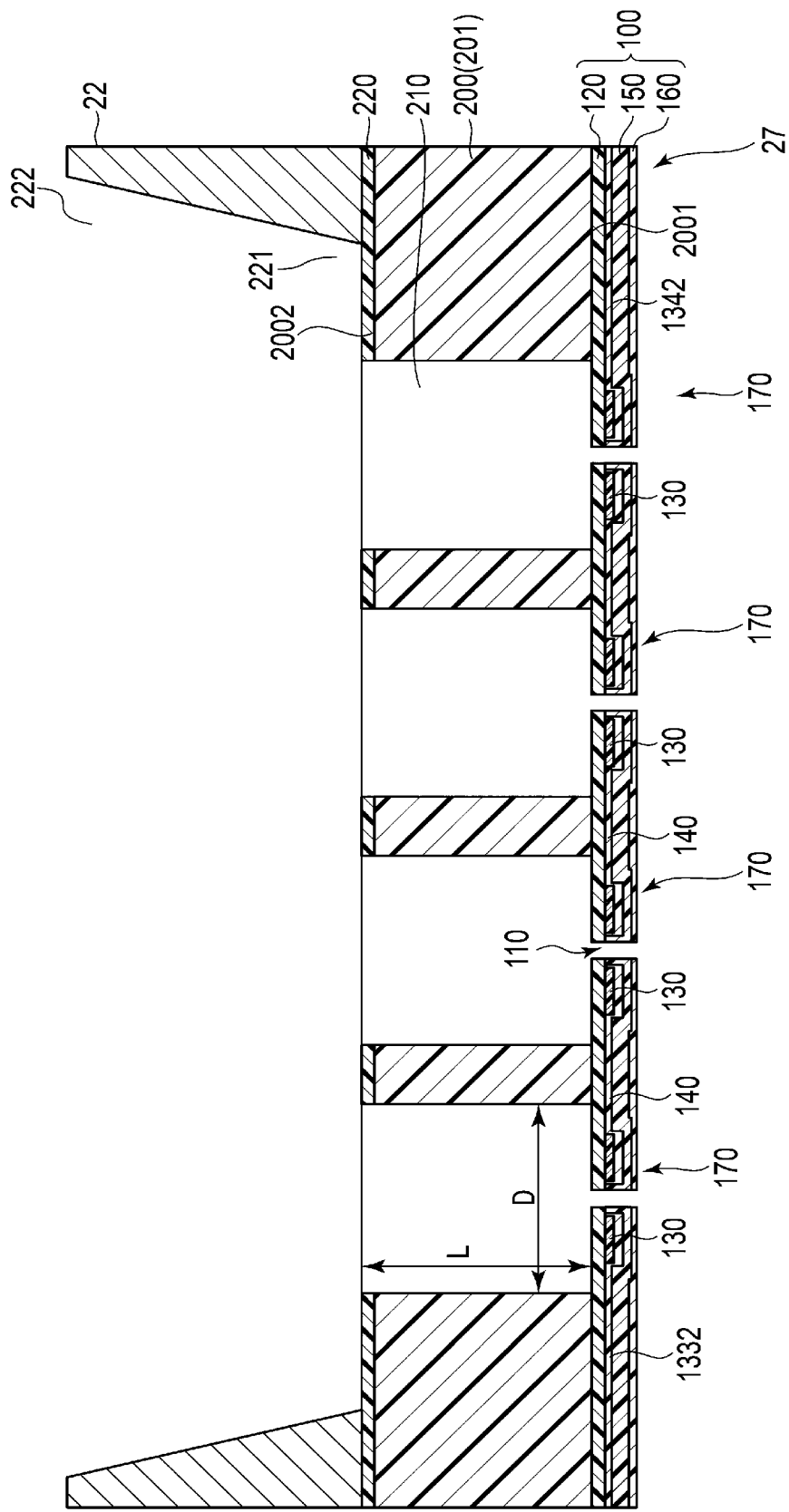
FIG. 9 is a cross-sectional view of a liquid medicine dropping device taken along a line F9-F9 of FIG. 8.
Figure 10:
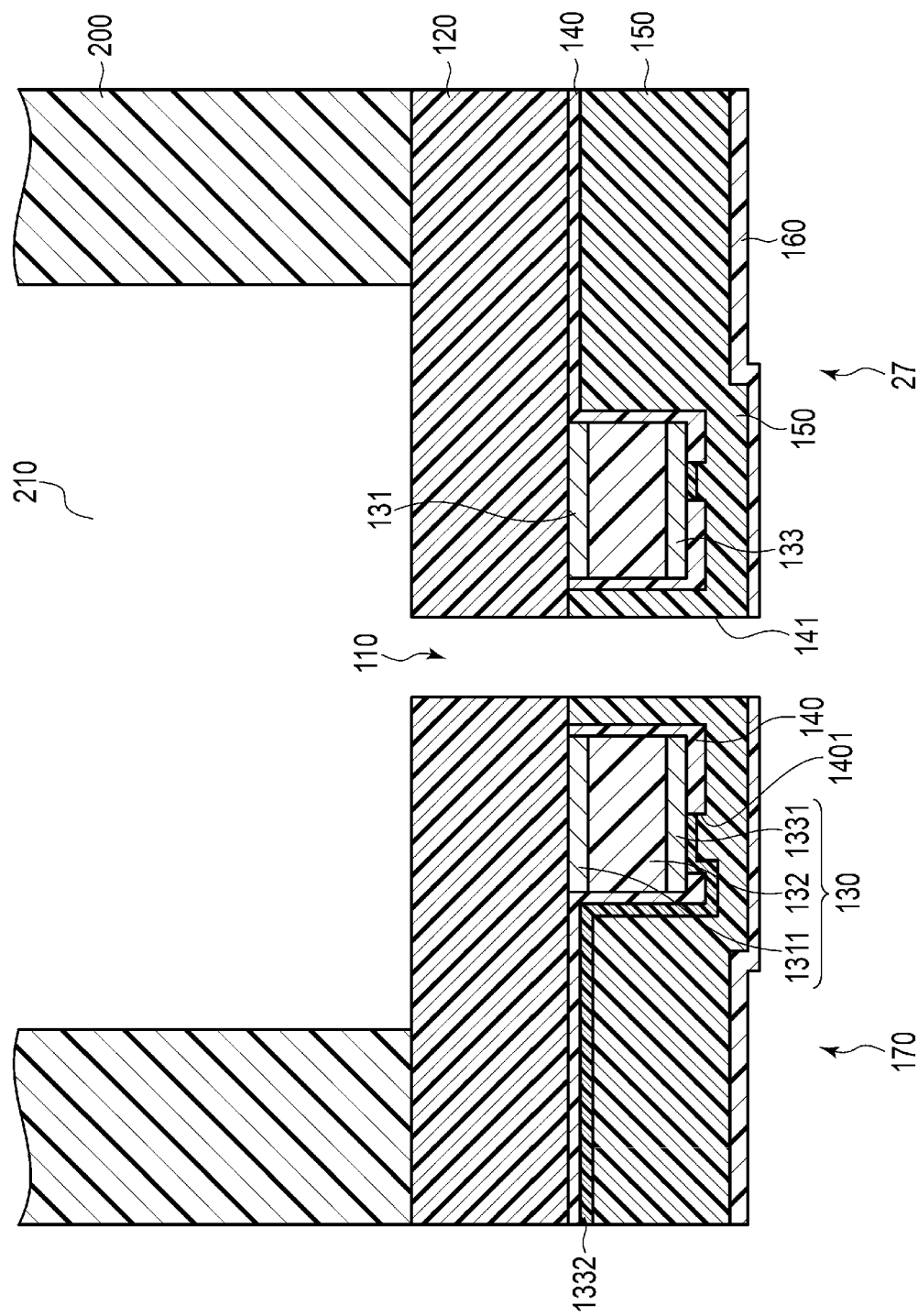
FIG. 10 is a cross-sectional view of a liquid medicine dropping device taken along a line F10-F10 of FIG. 8.

A configuration example of a droplet dispensing apparatus 500 of a first embodiment will be described with reference to FIGS. 1 to 10. FIG. 1 is a perspective view illustrating a schematic configuration of the droplet dispensing apparatus 500. FIG. 2 is a block diagram illustrating a configuration of the droplet dispensing apparatus 500, and FIG. 3 is a plan view schematically illustrating configurations of a holding portion 71 and a crystal sensor 72 of a QCM device 7 used in the droplet dispensing apparatus 500. FIG. 4 is a diagram schematically illustrating a configuration of the QCM device 7. FIG. 5 is a top view of a liquid medicine dropping device used in the droplet dispensing device 500. FIG. 6 is a bottom view illustrating a surface from which the liquid medicine discharge device 2 discharges droplets. FIG. 7 is a cross-sectional view illustrating a configuration of the liquid medicine dropping device 2 taken along a line F7-F7 of FIG. 5. FIG. 8 is a bottom view illustrating a surface from which a liquid medicine discharge array 27 discharges droplets. FIG. 9 is a cross-sectional view illustrating a configuration of the liquid medicine discharge array 27 taken along a line F9-F9 of FIG. 8. FIG. 10 is a cross-sectional view illustrating a configuration of the liquid medicine discharge array 27 taken along a line F10-F10 of FIG. 8.

As illustrated in FIGS. 1 and 2, the droplet dispensing device 500 includes a liquid discharge apparatus 1, the liquid dropping device 2, and the like. In the first embodiment, an example in which the droplet dispensing apparatus 500 dispenses a liquid medicine is described, and thus the liquid discharge apparatus 1 can be referred to as a liquid medicine discharge apparatus 1 and the liquid dropping device 2 can be referred to as a liquid medicine dropping device 2. For example, the liquid dropping device 2 is used as a disposable device.

The droplet dispensing apparatus 500 may have other components, structure, or devices in addition to the configuration illustrated in FIG. 1 or certain examples may exclude some portions of the depicted configuration. The droplet dispensing apparatus 500 is connected to a host computer 900 as illustrated in FIG. 2.

Here, the host computer 900 controls the droplet dispensing apparatus 500 according to an operator's input operations (e.g., operator instructions or commands). The host computer 900 includes an operation unit 901, a display unit 902, and the like. The host computer 900 includes a processor, a RAM, a ROM, a non-volatile memory (NVM), and the like.

The operation unit 901 receives inputs from the operator. The operation unit 901 is, for example, a keyboard, a mouse, a touch panel, or the like.

The display unit 902 displays various information under the control of a processor 11 (also referred to as a controller) of the droplet dispensing apparatus 500 which will be described later. The display unit 902 is, for example, a liquid crystal monitor. When the operation unit 901 is, for example, a touch panel or the like, the display unit 902 may be formed integrally with the operation unit 901.

The host computer 900 receives various inputs from the operator through the operation unit 901. For example, the host computer 900 receives an instruction from the operator indicating that a liquid medicine holding container 22 of the liquid medicine dropping device 2 is filled with a liquid medicine. The host computer 900 receives the operator's instruction for discharging a liquid medicine from the liquid medicine holding container 22.

When the host computer 900 receives instruction for discharging a liquid medicine from the liquid medicine holding container 22, the host computer transmits a signal for causing the droplet dispensing apparatus 500 to discharge the liquid medicine. The host computer 900 may receive an instruction for each liquid medicine holding container 22. For example, the host computer 900 may receive an instruction indicating that each liquid medicine holding container 22 has been filled with a liquid medicine or an instruction (command) for discharging a liquid medicine.

The liquid medicine discharge apparatus 1 controls the liquid medicine dropping device 2 so that the liquid medicine in the liquid medicine dropping device 2 is dispensed as droplets.

As illustrated in FIGS. 1 to 4, the liquid medicine discharge apparatus 1 includes a base 3, a mounting module 5, a moving device 6, the quartz crystal microbalance (QCM) device 7, a driving circuit 8, a memory 9, an interface 10, and the processor 11. Here, a front-back direction of the base 3 will be referred to as an X-direction, and a right-left direction of the base 3 will be referred to as a Y-direction. The X-direction and the Y-direction are orthogonal to each other.

The base 3 is formed in a rectangular flat plate shape. The base 3 includes a frame-shape attachment member 31 to which a microplate 4 is detachably attached.

The microplate 4 is fixed to the base 3. The microplate 4 is a reception portion that receives a sample and a liquid medicine supplied to the sample and discharged from the liquid medicine dropping device 2. The microplate 4 includes a plurality of well openings 300. The well openings 300 of the microplate 4 hold a predetermined liquid medicine and a sample. For example, the liquid medicine is a solution containing cells, blood cells, bacteria, plasma, an antibody, DNA, nucleic acid, or protein, or the like. The liquid medicine held in the well opening 300 is not limited to any particular type.

The mounting module 5 is a mounting portion on which the liquid medicine dropping device 2 is mounted. For example, the mounting module 5 includes a slit 51 for fixing the liquid medicine dropping device 2. The liquid medicine dropping device 2 is inserted into the slit 51 from a front opening portion side of the slit 51, so that the liquid medicine dropping device 2 is held in the liquid medicine discharge apparatus 1.

The moving device 6 includes a pair of X-direction guide rails 61, a pair of fixing stands 62, a pair of X-direction moving stands 63, a Y-direction guide rail 64, a Y-direction moving stand 65, an X-direction moving stand motor 66, a Y-direction moving stand motor 67, an X-direction moving stand control circuit 68, and a Y-direction moving stand control circuit 69.

The pair of X-direction guide rails 61 extend in the X-direction on the base 3 and on both sides of the microplate 4.

The pair of fixing stands 62 are installed on the base 3 and on both sides of the microplate 4. The fixing stand 62 includes, for example, two stands 621 and fixes and supports the X-direction guide rails 61 to the base 3 by the two stands 621. The two stands 621 support, for example, both ends of the X-direction guide rail 61.

The X-direction moving stand 63 is provided in the X-direction guide rail 61. The X-direction moving stand 63 moves along the X-direction guide rail 61. The pair of X-direction moving stands 63 fix and support the Y-direction guide rail 64. The pair of X-direction moving stands 63 support, for example, both ends of the Y-direction guide rail 64.

The Y-direction guide rail 64 is installed between the pair of X-direction guide rails 61 by being supported by the pair of X-direction moving stands 63.

The Y-direction moving stand 65 is provided in the Y-direction guide rail 64. The Y-direction moving stand 65 moves along the Y-direction guide rail 64. The Y-direction moving stand 65 fixes and supports the mounting module 5.

The X-direction moving stand motor 66 drives to move the X-direction moving stand 63 along the X-direction guide rail 61. The X-direction moving stand motor 66 may be configured to be provided in each of the pair of X-direction moving stands 63 and to move each of the pair of X-direction moving stands 63, or may be configured to be provided in one of the X-direction moving stands 63 and move the one of the X-direction moving stands 63 to make the other X-direction moving stand 63 follow.

The Y-direction moving stand motor 67 drives to move the Y-direction moving stand 65 along the Y-direction guide rail 64.

The X-direction moving stand control circuit 68 controls the driving of the X-direction moving stand motor 66 based on a signal received from the processor 11. The X-direction moving stand control circuit 68 supplies a signal or power to the X-direction moving stand motor 66 to drive the X-direction moving stand motor 66.

The Y-direction moving stand control circuit 69 controls the driving of the Y-direction moving stand motor 67 based on a signal received from the processor 11. The Y-direction moving stand control circuit 69 supplies a signal or power to the Y-direction moving stand motor 67 to drive the Y-direction moving stand motor 67.

The moving device 6 moves the liquid medicine dropping device 2 mounted on the mounting module 5 to any position in the XY plane by a combination of an operation of the X-direction moving stand 63 moving in the X-direction along the X-direction guide rail 61 and an operation of the Y-direction moving stand 65 moving in the Y-direction along the Y-direction guide rail 64.

As illustrated in FIGS. 1 to 4, the QCM device 7 includes the holding portion 71, the crystal sensor 72, a vibration voltage generation unit 73, and a resonance frequency measuring unit 74. The QCM device 7 detects a discharge state of a liquid medicine from the liquid medicine dropping device 2 before the liquid medicine is discharged to the microplate 4 by the liquid medicine dropping device 2.

The holding portion 71 is provided in the base 3. The holding portion 71 is disposed adjacent to the attachment member 31 of the base 3. For example, the holding portion 71 is adjacent to one side of the attachment member 31 in the Y-direction. The holding portion 71 supports the crystal sensor 72. The holding portion 71 is, for example, a stand and supports the crystal sensor 72 on the upper surface thereof.

The crystal sensor 72 includes a quartz crystal 721 and a pair of electrodes 722. The crystal sensor 72 performs thickness-shear vibration (thickness-shear-mode resonator) which is shear vibration in a direction horizontal to a crystal surface. The quartz crystal 721 is formed in, for example, a disk shape. As a specific example, the quartz crystal is a quartz thin film which is cut out at an angle called AT-cut.

The pair of electrodes 722 are respectively connected to both principal surfaces of the quartz crystal 721. One of the pair of electrodes 722 is connected to the vibration voltage generation unit 73, and the other electrode is connected to the resonance frequency measuring unit 74.

The vibration voltage generation unit 73 is connected to the electrodes 722 of the crystal sensor 72. The vibration voltage generation unit 73 outputs a vibration voltage for vibrating the crystal sensor 72 to the electrodes 722 of the crystal sensor 72 based on a signal received from the processor 11.

The resonance frequency measuring unit 74 outputs a resonance frequency of the crystal sensor 72 to the processor 11 as a signal.

The QCM device 7 obtains the mass of a liquid medicine which is dispensed as droplets from the liquid medicine dropping device and landed on the electrode 722 using a quartz crystal microbalance method (QCM method) for measuring a change in the mass of a material from a characteristic that a resonance frequency of the quartz crystal 721 changes depending on the mass of a material on the electrode 722. A relationship between a change in resonance frequency and the mass of an attached material is expressed by the following Expression 1 called the Sauerbrey equation.

$$\Delta F = -\frac{2F_0^2}{\sqrt{\rho_Q \mu_Q}} \frac{\Delta m}{A} \quad (1)$$

Here, $\Delta F$ is the difference in resonance frequency before and after the mass change of material on the crystal, $\Delta m$ is difference in the mass of material on the electrode 722, F0 is a fundamental frequency, $\rho 0$ is a density of the crystal (2648 kg/m$^3$), $\mu 0$ is a shearing stress of crystal ($2.947 \times 10^{10}$ kg·m·s), and A is a piezoelectric efficiency active area (electrode area).

In a QCM method, the frequency decreases when the amount of material attached to an electrode increases, and the frequency increases when the amount of attached material decreases. Accordingly, the QCM device 7 detects changes in the frequency of the quartz crystal 721 before and after a liquid medicine has landed on the electrode 722 by using the resonance frequency measuring unit 74. The QCM device 7 outputs the change in the vibration frequency of the quartz crystal 721, which is detected by the resonance frequency measuring unit 74, to the processor 11, and the processor 11 measures the mass of the liquid medicine on the electrode 722 based on the change in the frequency detected by the resonance frequency measuring unit 74.

The driving circuit 8 drives the liquid medicine dropping device 2. The driving circuit 8 supplies a driving signal to the liquid medicine dropping device 2 whenever a liquid medicine is to be discharged from the liquid medicine dropping device 2. The driving circuit 8 outputs the driving signal to the liquid medicine dropping device 2 based on a signal received from the processor 11.

The memory 9 stores various data. For example, the memory 9 stores a control program, control data, and the like. The control program and the control data are incorporated in advance according to specifications of the droplet dispensing apparatus 500. The control program is a program for supporting a function realized by the droplet dispensing apparatus 500, or the like.

The memory 9 temporarily stores data being processed by the processor 11, or the like. The memory 9 stores a setting value required to execute an application program, as a database. The memory 9 stores execution results of the application program, and the like.

The memory 9 is, for example, a non-volatile memory. The memory 9 may be, for example, a ROM, a RAM, and an SSD.

The interface 10 transmits and receives data to and from the host computer 900. For example, the interface 10 is connected to the host computer 900 through a wired or wireless line. For example, the interface 10 may support LAN connection, USB connection, or Bluetooth (registered trademark) connection.

The processor 11 may be, for example, a central processing unit (CPU) operates in conjunction with the memory 9 as controller or a control unit. The processor 11 controls each unit of the droplet dispensing apparatus 500 in order to realize various functions of the droplet dispensing apparatus 500 according to a control program, control data, or the like. The processor 11 includes amass calculation unit 111, a liquid amount measurement control unit 112, and a time tracking unit 113. The mass calculation unit 111 implements functions by execution of various programs, stored in the memory 9, by the processor 11 or is alternatively a processing circuit such as a dedicated hardware circuit.

The liquid amount measurement control unit 112 implements functions by execution of various programs, stored in the memory 9, by the processor 11 or is alternatively a processing circuit such as a dedicated hardware circuit. The liquid amount measurement control unit 112 controls the settings and operations in a process of measuring the amount of liquid attached to the crystal sensor 72. The time tracking unit 113 implements functions by execution of various programs, stored in the memory 9, by the processor 11 or is alternatively a processing circuit such as a dedicated hardware circuit. The time tracking unit 113 tracks an elapsed time during the measurement of a liquid amount.

The QCM device 7 and the processor 11 together constitute a detection unit that detects a change in a resonance frequency.

The liquid medicine dropping device 2 discharges a liquid medicine based on the control of the liquid medicine discharge apparatus 1. As illustrated in FIGS. 1, 2, and 5 to 10, the liquid medicine dropping device 2 includes a base member 21, a plurality of liquid medicine holding containers 22, a plurality of electrical substrates 23, and a plurality of liquid medicine dropping arrays 27.

The base member 21 is formed in a flat plate shape which is a rectangular plate-shaped plate body. For example, the base member 21 is formed in a rectangular shape which is elongate in one direction. As illustrated in FIG. 5, the base member 21 includes mounting fixing notches 28 for mounting and fixing to the mounting module 5 at both ends in a longitudinal direction. The mounting fixing notches 28 engage with the mounting module 5. The two notches 28 of the base member 21 are formed in, for example, a semi-oval notch shape. In other examples, the mounting fixing notch 28 may have a semicircular, semielliptical, or triangular notch shape, or the like. In the present embodiment, the two notches 28 have different shapes. Thereby, the right and left shapes of the base member 21 are different from each other, and thus confirmability of the correct posture for the base member 21 is improved.

As illustrated in FIG. 7, in the base member 21, the number of cylindrical liquid medicine holding container recessed portions 211 is equal to the number of liquid medicine holding containers 22. The cylindrical liquid medicine holding container recessed portions 211 are formed at positions corresponding to the arrangement of the respective liquid medicine holding containers 22 on the surface side. As illustrated in FIG. 7, in the base member 21, a rectangular electrical substrate recessed portion 212 for mounting the electrical substrate 23, and a liquid medicine dropping array portion opening 213 communicating with the electrical substrate recessed portion 212 are formed on the back surface side which is a side facing the microplate 4. The electrical substrate recessed portion 212 extends from an end vicinity position (a right end vicinity position in FIG. 7) in a direction orthogonal to the longitudinal direction (the Y-direction in FIG. 6) of the base member 21 to a position overlapping a portion of the liquid medicine holding container 22 in a direction orthogonal to the principal surface direction of the base member 21.

The base member 21 is provided with the liquid medicine dropping array portion opening 213. As illustrated in FIG. 6, the liquid medicine dropping array portion opening 213, which is a rectangular opening portion, is formed at a position overlapping the liquid medicine holding container recessed portion 211 on the back surface side of the base member 21.

As illustrated in FIGS. 1 and 5, the plurality of liquid medicine holding containers 22 are arranged in parallel in a row in the Y-direction on the surface side of the base member 21. In the present embodiment, an example in which eight liquid medicine holding containers 22 are provided in the base member 21 is described, but the number of liquid medicine holding containers 22 is not limited to eight. The liquid medicine holding container 22 is a cylindrical container of which the upper surface is open as illustrated in FIG. 7.

The bottom of the liquid medicine holding container 22 is bonded and fixed to the liquid medicine holding container recessed portion 211. The liquid medicine holding container 22 includes a lower surface opening portion 221 and an upper surface opening portion 222. The lower surface opening portion 221 is formed in the bottom of the liquid medicine holding container 22. The lower surface opening portion 221 is a discharge portion for a liquid medicine. The upper surface opening portion 222 is formed in the ceiling portion of the liquid medicine holding container 22. The upper surface opening portion 222 is a supply port for a liquid medicine. An opening area of the upper surface opening portion 222 of the liquid medicine holding container 22 is larger than an opening area of the lower surface opening portion 221.

A number of electrical substrates 23 equal to the number of liquid medicine holding containers 22 is provided. As illustrated in FIG. 6, the plurality of electrical substrates 23 are arranged in parallel in a row in the Y-direction on the back surface side of the base member 21. The electrical substrate 23 is a rectangular flat plate member. The electrical substrates 23 are bonded and fixed to the electrical substrate recessed portion 212.

The electrical substrate 23 includes an electrical substrate wiring 24 which is patterned on a surface opposite to a surface bonded and fixed to the electrical substrate recessed portion 212. The electrical substrate wiring 24 includes wiring patterns 241, 242, and 243, and the like. An electrode connection terminal 26 connected to a driving element 130 (a first driving element 1301 and a second driving element 1302) to be described later is formed at one end of each of the wiring patterns 241, 242, and 243 through a wiring wire 12. The wiring patterns 241, 242, and 243 are respectively connected to a first upper electrode 133 (first conductive line), a lower electrode 131, and a second upper electrode 134 (second conductive line) illustrated in FIG. 10 through the electrode connection terminal 26.

A control signal input terminal 25 for inputting a driving signal received from the driving circuit 8 is formed at one end of the electrical substrate wiring 24. For example, the control signal input terminal 25 is shaped so that it can be connected to a plate spring connector or the like.

For example, a driving signal received from the driving circuit 8 is input to the wiring patterns 241, 242, and 243.

The driving signal received from the driving circuit 8 is input as a potential difference between the first upper electrode 133 and the lower electrode 131 or a potential difference between the second upper electrode 134 and the lower electrode 131. Here, it is assumed that the lower electrode 131 is maintained at a fixed voltage.

The first upper electrode 133 includes an electrode portion 1331, a wiring portion 1332, and a terminal portion 1333. The terminal portion 1333 is electrically connected to an end of the wiring portion 1332. The other end of the wiring portion 1332 is electrically connected to the electrode portion 1331.

The second upper electrode 134 includes an electrode portion 1341, a wiring portion 1342, and a terminal portion 1343. The terminal portion 1343 is electrically connected to an end of the wiring portion 1342. The other end of the wiring portion 1342 is electrically connected to the electrode portion 1341.

The first upper electrode 133 and the second upper electrode 134 are formed of a Pt thin film. As other electrode materials, Ni, Cu, Al, Ti, W, Mo, Au, SrRuO3, and the like can also be used. As other film forming methods, vapor deposition and plating can also be used. As the first upper electrode 133 and the second upper electrode 134, various metals laminated on each other can also be used.

The lower electrode 131 includes an electrode portion 1311, a wiring portion 1312, and a terminal portion 1313. The terminal portion 1313 is electrically connected to an end of the wiring portion 1312. The other end of the wiring portion 1312 is electrically connected to the electrode portion 1311.

The lower electrode 131 is formed to have a thickness of 0.5 μm by laminating titanium (Ti) and platinum (Pt) using, for example, a sputtering method. The film thickness of the lower electrode 131 is in a range of approximately 0.01 to 1 μm. As the lower electrode 131, other materials such as Ni, Cu, Al, Ti, W, Mo, Au, and SrRuO3 can be used. The lower electrode 131 can also be used by laminating various metals on each other.

number of liquid medicine dropping arrays 27 provided is equal to the number of liquid medicine holding containers 22. As illustrated in FIG. 7, the liquid medicine dropping array 27 is bonded and fixed to a lower surface of the liquid medicine holding container 22 in a state where the liquid medicine dropping array 27 covers the lower surface opening portion 221 of the liquid medicine holding container 22. The liquid medicine dropping array 27 is disposed a position corresponding to the liquid medicine dropping array portion opening 213 of the base member 21.

As illustrated in FIG. 8, a plurality of first pressure chambers 2101 and a plurality of second pressure chambers 2102 are formed in a grid-like pattern in the liquid medicine dropping array 27. Here, the first pressure chambers 2101 and the second pressure chambers 2102 are disposed in 4×4 rows.

The plurality of first pressure chambers 2101 are formed at predetermined intervals. The plurality of first pressure chambers 2101 are formed at positions diagonally opposite to each other.

The second pressure chambers 2102 are adjacent to the first pressure chambers 2101. As illustrated in FIG. 8, the second pressure chambers 2102 are adjacent to the first pressure chambers 2101 in an X-axis direction and a Y-axis direction. That is, the first pressure chambers 2101 and the second pressure chambers 2102 are alternately formed in the X-axis direction and the Y-axis direction.

As illustrated in FIG. 9, the liquid medicine dropping array 27 is formed by laminating a nozzle plate 100 and a pressure chamber structure 200 on each other. The nozzle plate 100 includes nozzles 110 (a first nozzle 1101 and a second nozzle 1102) that discharges a liquid medicine, a vibration plate 120, the driving element 130 (the first driving element 1301 and the second driving element 1302) which is a driving unit, an insulating film 140 that insulates the lower electrode 131 from the wiring portion 1332 of the first upper electrode 133 and the wiring portion 1342 of the second upper electrode 134, a protecting film 150 which is a protecting layer, and a liquid repellent film 160. An actuator 170 comprises a vibration plate 120 and a driving element 130. The plurality of nozzles 110 are positioned on the inner side of the lower surface opening portion 221 which is a liquid medicine outlet of the liquid medicine holding container 22.

The vibration plate 120 is deformed in a thickness direction by the driving element 130 having a surface shape change. The liquid medicine dropping device 2 discharges a liquid medicine supplied to the nozzles 110 due to a change in the pressure in the pressure chamber 210 which occurs due to a change in the storage capacity of the pressure chamber 210 caused by the deformation of the vibration plate 120.

The storage capacity of the first pressure chamber 2101 changes in association with the driving of the first driving element 1301. A first nozzle 1101 communicating with the first pressure chamber 2101 is formed in the liquid medicine dropping array 27. A liquid medicine in the first pressure chamber 2101 is discharged through the first nozzle 1101. The first driving element 1301 is electrically connected to the electrode portion 1331 and the electrode portion 1311.

The storage capacity of the second pressure chamber 2102 changes in association with the driving of the second driving element 1302. A second nozzle 1102 communicating with the second pressure chamber 2102 is formed in the liquid medicine dropping array 27. A liquid medicine in the second pressure chamber 2102 is discharged through the second nozzle 1102. The second driving element 1302 is electrically connected to the electrode portion 1341 and the electrode portion 1311.

That is, the first driving element 1301 is electrically connected to the driving circuit 8 by the first upper electrode 133 and the lower electrode 131. The second driving element 1302 is electrically connected to the driving circuit 8 by the second upper electrode 134 and the lower electrode 131.

The plurality of nozzles 110 are arranged in 4×4 rows with respect to one well opening 300 of a 1536 Well microplate. For example, an opening size of the well opening 300 of the 1536 well microplate is a square of which one side is approximately 1.7 mm. A distance between the centers of the nozzles 110 adjacent to each other among the plurality of nozzles 110 arranged in 4×4 rows is 0.25 mm. The size of the center of the nozzles 110 arranged in 4×4 rows disposed inside the well opening 300 is 0.75 mm in the X-direction and 0.75 mm in the Y-direction, which is smaller than the size of the well opening 300 of the 1536 well microplate.

The vibration plate 120 is formed integrally with, for example, the pressure chamber structure 200. When a silicon wafer 201 for manufacturing the pressure chamber structure 200 is heated in an oxygen atmosphere, an $SiO_2$ (silicon oxide) film is formed on the surface of the silicon wafer 201. As the vibration plate 120, the $SiO_2$ (silicon oxide) film on the surface of the silicon wafer 201 formed by being heated in an oxygen atmosphere is used. The vibration plate 120 may be formed by forming an SiO$_2$ (silicon oxide) film on the surface of the silicon wafer 201 by a CVD method (chemical vapor deposition method).

The film thickness of the vibration plate 120 is preferably in a range of 1 to 30 μm. As the vibration plate 120, a nitride material such as silicon nitride (SiN), an oxidation material such as aluminum oxide (Al$_2$O$_3$), or the like can also be used instead of the SiO$_2$ (silicon oxide) film.

The driving element 130 is formed in each of the nozzles 110. The driving element 130 has an annular shape surrounding the nozzle 110. The shape of the driving element 130 is not limited, and may have, for example, a C shape formed by notching a portion of a circle.

As illustrated in FIG. 10, the driving element 130 includes the electrode portion 1311 and the electrode portion 1331 or the electrode portion 1341 with a piezoelectric film 132 being a piezoelectric body interposed therebetween.

In FIG. 8, in the first driving element 1301, the piezoelectric film 132 is formed between the electrode portion 1311 and the electrode portion 1331. In the second driving element 1302, the piezoelectric film 132 is formed between the electrode portion 1311 and the electrode portion 1341.

The electrode portion 1311, the piezoelectric film 132, and the electrode portion 1331 or the electrode portion 1341 are circular patterns that are coaxial with the nozzle 110 and have the same size.

The piezoelectric film 132 is, for example, a piezoelectric material having a thickness of 2 μm. The piezoelectric film 132 is formed of lead zirconate titanate (Pb(Zr,Ti)O3; PZT). The piezoelectric film 132 is coaxial with, for example, the nozzle 110 and has an annular shape in which an outer diameter having the same shape as that of the electrode portion 1311 is 133 μm, and an inner diameter is 42 μm. The film thickness of the piezoelectric film 132 is in a range of approximately 1 to 5 μm.

As the piezoelectric film 132, a piezoelectric material such as lead titanate (PbTiO3; "PTO"), PMNT (Pb(Mg1/3Nb2/3)O3-PbTiO3), PZNT (Pb(Zn1/3Nb2/3)O3-PbTiO3), ZnO, or AlN can also be used.

The piezoelectric film 132 generates polarization in the thickness direction. When an electric field in the same direction as the polarization is applied to the piezoelectric film 132, the piezoelectric film 132 extends and contracts in a direction orthogonal to the electric field direction. In other words, the piezoelectric film 132 contracts or extends in a direction orthogonal to the film thickness.

The nozzle plate 100 includes the insulating film 140 that insulates the lower electrode 131 and the first upper electrode 133 or the second upper electrode 134 from each other. The insulating film 140 covers the peripheral edges of the electrode portion 1311, the piezoelectric film 132, and the electrode portion 1331 in a region in which the first driving element 1301 is formed. The insulating film 140 covers the peripheral edges of the electrode portion 1311, the piezoelectric film 132, and the electrode portion 1341 in a region in which the second driving element 1302 is formed.

The insulating film 140 covers the wiring portion 1312 of the lower electrode 131. The insulating film 140 covers the vibration plate 120 in partial regions of the wiring portion 1332 of the first upper electrode 133 and the wiring portion 1342 of the second upper electrode 134. The insulating film 140 includes a contact portion 1401 which is an opening portion that electrically connects the electrode portion 1331 and the wiring portion 1332 of the first upper electrode 133 to each other or electrically connects the electrode portion 1341 and the wiring portion 1342 of the second upper electrode 134 to each other.

The protecting film 150 includes a cylindrical liquid medicine passing portion 141 that connects with the nozzles 110 of the vibration plate 120.

The nozzle plate 100 includes the liquid repellent film 160 that covers the protecting film 150. The liquid repellent film 160 is formed by spin coating, for example, a silicon-based resin having a characteristic of repelling a liquid medicine. The liquid repellent film 160 can also be formed of a material having a characteristic of repelling a liquid medicine such as a fluorine-containing resin.

The pressure chamber structure 200 includes a warp reducing film 220 being a warp reducing layer on a surface opposite to the vibration plate 120. The pressure chamber structure 200 includes a pressure chamber 210 that reaches the position of the vibration plate 120 through the warp reducing film 220 and fluidly communicates with the nozzle 110. The pressure chamber 210 is formed into a circle which is positioned coaxially with, for example, the nozzle 110.

The pressure chamber 210 includes an opening portion (liquid medicine supply port) which connects with the lower surface opening portion 221 of the liquid medicine holding container 22. It is preferable that a size L in a depth direction of the pressure chamber 210 is larger than a size D in a width direction of the opening portion of the pressure chamber 210. The size L in the depth direction is set to be larger than the size D in the width direction, so that the pressure applied to a liquid medicine in the pressure chamber 210 due to the oscillation of the vibration plate 120 of the nozzle plate 100 is delayed in escaping to the liquid medicine holding container 22.

A side on which the vibration plate 120 of the pressure chamber 210 is disposed is assumed to be a first surface 2001, and a side on which the warp reducing film 220 is disposed is assumed to be a second surface 2002. The liquid medicine holding container 22 is bonded to the warp reducing film 220 side of the pressure chamber structure 200 using, for example, an epoxy-based adhesive. The pressure chamber 210 of the pressure chamber structure 200 fluidly communicates with the lower surface opening portion 221 of the liquid medicine holding container 22 through the opening portion on the warp reducing film 220 side.

Next, an operation example in which the droplet dispensing apparatus 500 discharges a liquid medicine will be described.

The liquid medicine dropping device 2 of the droplet dispensing apparatus 500 is used by being fixed to the mounting module 5 of the liquid medicine discharge apparatus 1. For example, an operator inserts the liquid medicine dropping device 2 from the front opening portion side of the slit 51 of the mounting module 5 in order to attach the liquid medicine dropping device 2 to the mounting module 5.

After the operator inserts the liquid medicine dropping device 2 into the slit 51, a predetermined amount of liquid medicine is then supplied to the liquid medicine holding container 22 via the upper surface opening portion 222 using a pipette or the like. The liquid medicine is held inside the liquid medicine holding container 22. The lower surface opening portion 221 formed in the bottom of the liquid medicine holding container 22 is fluidly communicated with the liquid medicine dropping array 27. Therefore, the liquid medicine held in the liquid medicine holding container 22 fills into the pressure chambers 210 of the liquid medicine dropping array 27 via the lower surface opening portion 221 formed in the bottom of the liquid medicine holding container 22.

The liquid medicine held in the liquid medicine dropping device 2 is typically a solution containing, for example, any one of: low molecular weight compounds, fluorescent reagents, proteins, antibodies, nucleic acids, plasma, bacteria, blood cells, or biological cells. A solvent (a material having the highest weight percent or volume percent) in the liquid medicine solution is typically water, glycerin, or dimethylsulfoxide (DMSO). The liquid medicine held in the liquid medicine dropping device 2 is not limited to any specific type and need not necessarily be dissolved or dispersed in a solvent.

After the operator supplies the liquid medicine to the liquid medicine holding container 22, the operator then inputs an operation (instruction) into the liquid medicine discharge apparatus 1 for starting the discharge of the liquid medicine. In some examples, the operator may input the operation for starting the discharge of the liquid medicine to host computer 900 used for controlling the liquid medicine discharge apparatus 1, or the like. The operator also inputs an amount (such as the weight) of the liquid medicine to be discharged from the liquid medicine dropping device 2 into the liquid medicine discharge apparatus 1 or the host computer 900.

When the processor 11 of the liquid medicine discharge apparatus 1 receives the operator input, the processor sets values for various signals based on conditions of the discharge of the liquid medicine which is performed by the liquid medicine dropping device 2. Next, the processor 11 performs detection and correction of a discharge state of the liquid medicine from the liquid medicine dropping device 2 which will be described later. After the correction ends, the processor 11 controls the moving device 6 so that the liquid medicine dropping device 2 is moved to a position where the liquid medicine is discharged. After the liquid medicine dropping device 2 is moved, the processor 11 supplies a driving signal for discharging a liquid medicine to the liquid medicine dropping device 2. That is, the driving circuit 8 supplies the driving signal to each of the first driving element 1301 and the second driving element 1302 of the liquid medicine dropping device 2.

The driving signal is supplied to each of the lower electrode 131, the first upper electrode 133, and the second upper electrode 134 from the electrode connection terminal 26 of the electrical substrate wiring 24. The vibration plate 120 of the actuator 170 is deformed in association with the application of the driving signal to the driving element 130 to change the storage capacity of the pressure chamber 210. The liquid medicine is discharged as liquid medicine droplets from the nozzles 110 due to a change in the pressure on the liquid medicine in the pressure chamber 210. As a result, the liquid medicine dropping device 2 ejects a predetermined amount of liquid into the well openings 300 of the microplate 4 from the nozzles 110.

For example, the amount of liquid in one droplet discharged from a nozzle 110 of the liquid medicine dropping device 2 is about 2 to 5 pL. Therefore, the liquid medicine discharge apparatus 1 can control the dispensing of a liquid in volume increments on the order of picoliters (pL) to microliters (μL) into the well openings 300 of the microplate 4 by controlling the number of discharged droplets.

Figure 11:
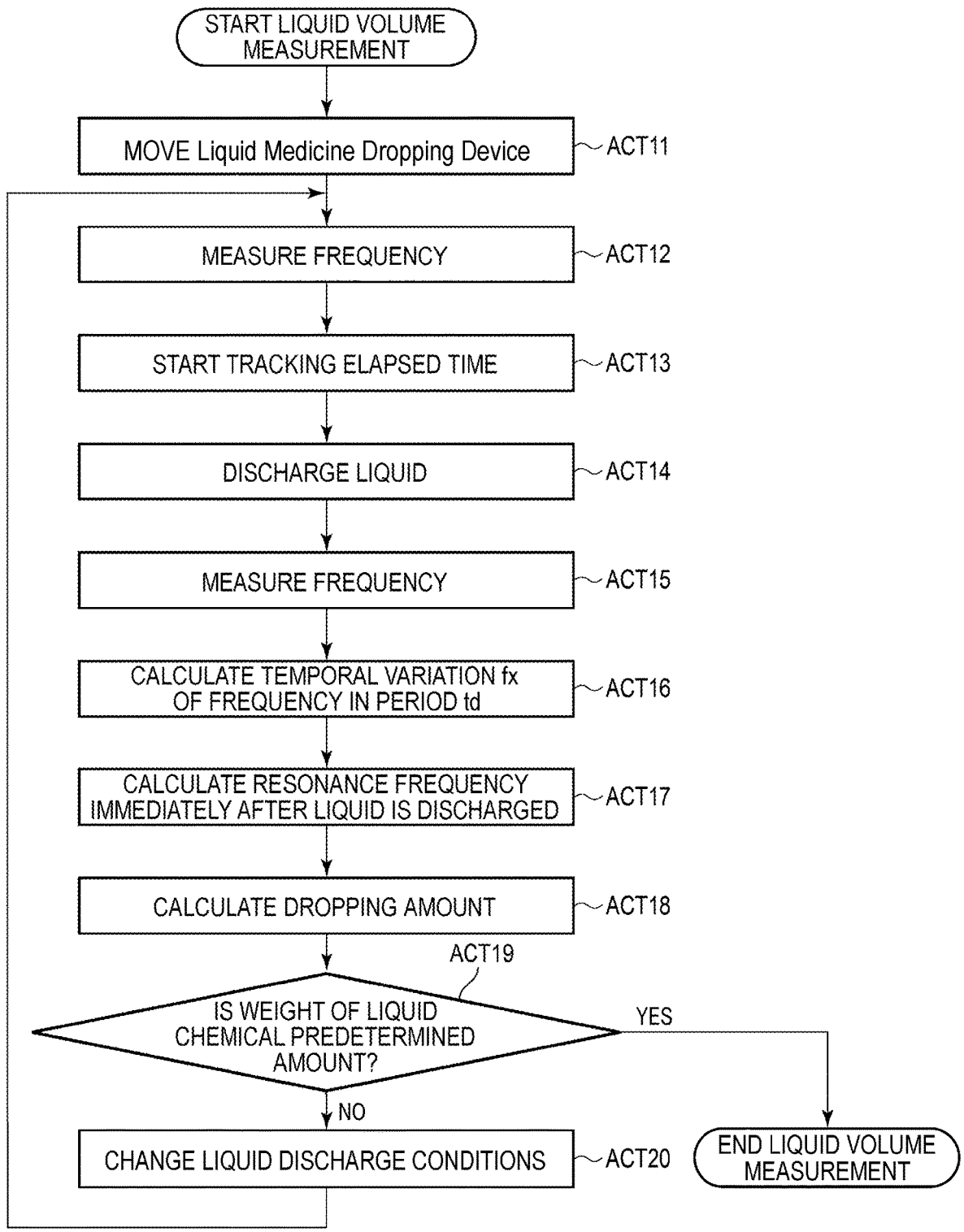
FIG. 11 is a flowchart of measurement and correction of a discharge amount of a liquid medicine discharged from a liquid medicine dropping device of a droplet dispensing apparatus according to a first embodiment.
Figure 12:
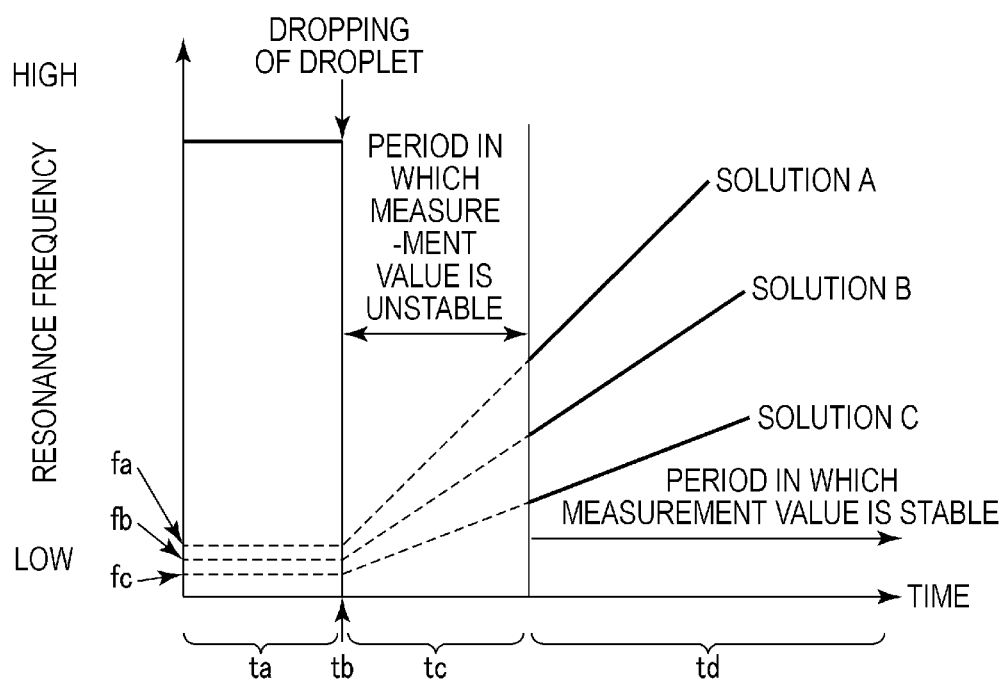
FIG. 12 is a diagram illustrating aspects related to a relationship between a resonance frequency and an elapsed time in the measurement of a discharge amount of a liquid medicine.

Next, an operation example in which the droplet dispensing apparatus 500 detects and corrects the amount of liquid medicine discharged from the liquid medicine dropping device 2 will be described using FIGS. 11 and 12. Such detection and correction are performed, for example, after an instruction for starting the discharge of the liquid medicine has been input to the liquid medicine discharge apparatus 1 but before the liquid medicine is dispensed into the microplate 4.

First, the processor 11 controls the moving device 6 to move the liquid medicine dropping device 2 to a measurement position (ACT11). Here, the measurement position is, for example, where the nozzle 110 of the liquid medicine dropping device 2 faces substantially the center of the electrode 722 of the crystal sensor 72. When a plurality of nozzles 110 are provided, a discharge state of a liquid medicine can be detected and corrected, for example, for a single nozzle 110 or for each set of a plurality of nozzles 110 discharging a liquid to the well opening 300. As such, when a discharge state of a liquid medicine is detected for each nozzle 110 or for each set of a plurality of nozzles 110, the nozzles 110 to be measured are sequentially moved to the measurement position for testing/measurement purposes.

Next, the processor 11 vibrates the crystal sensor 72 by controlling the vibration voltage generation unit 73 before discharging a liquid medicine from the liquid medicine dropping device 2 so that the resonance frequency measuring unit 74 measures a frequency (ACT12). The processor 11 also stores the measured frequency in the memory 9 as a reference frequency for measuring a liquid medicine discharged from the liquid medicine dropping device 2. Here, the processor 11 stores, for example, a nozzle and a frequency corresponding to each other in the memory 9 in association with each other. The processor 11 starts to measure an elapsed time from the measurement of the reference frequency by the time tracking unit 113 (ACT13).

Next, the processor 11 controls the liquid discharge device 2 so that the liquid medicine is discharged to the crystal sensor 72 (ACT14). The processor 11 vibrates the crystal sensor 72 by controlling the vibration voltage generation unit 73 to measure a frequency using the resonance frequency measuring unit 74 (ACT15). Here, as illustrated in FIG. 12, the processor 11 vibrates the crystal sensor 72 from at least when a droplet is dispensed (time tb) onto the crystal sensor 72 and continues vibrating the crystal sensor 72 until after a period td elapses after an initial period tc. The measurement value is considered unstable during the period tc and stable during the period td. For example, the processor 11 stores a measured frequency in the memory 9 in association with a time. The processor 11 calculates a temporal variation fx (temporal change trend or temporal change function) for the resonance frequency during the period td using the measured resonance frequency data acquired for the period td (ACT16). The processor 11 stores the temporal variation fx in the memory 9. Here, for example, the length of the period tc is set in advance and stored in the memory 9. Similarly, the length of period td can be set in advance and stored in the memory 9.

Next, the processor 11 calculates a resonance frequency immediately after the liquid medicine is discharged from the liquid medicine dropping device 2, from the reference frequency measured in ACT12 and the temporal variation fx in the resonance frequency in the period td (ACT17). That is, in the period td, a resonance frequency of the quartz crystal with the liquid medicine thereon is measured, so that a variation in a resonance frequency per unit time in the period td can be calculated for a liquid medicine as indicated by a solid line in FIG. 12 as the temporal variation fx in the resonance frequency. Then, a temporal variation in the resonance frequency (change in resonance frequency over time) in the period tc of the liquid medicine can be estimated as indicated by a dashed line in FIG. 12 from the measurement of the reference frequency and the temporal variation fx. The resonance frequency immediately after the liquid medicine is discharged to the crystal sensor 72 can be estimated based on the estimated temporal variation in the resonance frequency for the period tc.

Next, the processor 11 calculates the weight of the liquid medicine initially attached to the crystal sensor 72 by controlling the mass calculation unit 111 based on changes (ΔF) in resonance frequencies from the reference frequency obtained in ACT12 to the frequency obtained in ACT17 (ACT18).

Next, the processor 11 determines whether the calculated weight of the liquid medicine equals a predetermined amount (ACT19). The predetermined amount can be a set (target) value which was input to the liquid discharge apparatus 1 or the host computer 900 in advance by an operator and then stored in, for example, the memory 9.

When the calculated weight of the liquid medicine does not equal the predetermined amount (NO in ACT19), the processor 11 changes various setting values (discharge conditions) for the liquid medicine discharge of the liquid medicine dropping device 2 (ACT20), and returns to ACT12 again.

When the calculated weight of the liquid medicine is equal to the predetermined amount (YES in ACT19), the processor 11 ends the measurement of the weight of the liquid medicine discharged by the liquid medicine dropping device 2. Then, the processor 11 performs the operation of discharging the liquid medicine onto the microplate 4 as described above.

In this way, the QCM device 7 of the droplet dispensing apparatus 500 can measure the weight of a liquid (e.g., a liquid medicine) on the crystal sensor 72 which is dispensed as a droplet from the liquid discharge device 2 and adheres onto the crystal sensor 72. The QCM device 7 calculates a temporal variation fx for resonance frequency during the period td for which a measurement value has stabilized and then back calculates the resonance frequency that would have been measured immediately after the discharge of droplets using the calculated temporal variation fx. In particular, in the QCM method, the measured frequency is typically unstable in some predetermined period (tc) immediately after a liquid is adhered onto the crystal sensor 72, and thus a variation occurs in the frequency measurement result for each measurement during this initial period. However, the QCM device 7 can determine the weight of droplets initially adhered onto the crystal sensor 72 without using an actual measurement value obtained in the initial period in which a resonance frequency is not yet stabilized immediately after droplets are landed on the crystal sensor 72. As a result, the QCM device 7 can measure the weight of a liquid discharged from the liquid discharge device 2 with high accuracy.

The QCM device 7 is configured to calculate a temporal variation fx in a resonance frequency. This is based on the assumption that the liquid discharged onto the crystal sensor 72 has a volume on an order of picoliters (pL) to nanoliters (μL), and the liquid adhered to the crystal sensor 72 has a high specific surface area, and thus a solvent will be quickly vaporized/volatilized, thus the weight thereof decreases as vaporization progresses with time, and a resonance frequency of the crystal sensor 72 changes accordingly. For a liquid having a vaporization amount varying per unit time, the weight of droplets adhered onto the crystal sensor 72 can be obtained based on the characteristics for each liquid being tested or otherwise utilized by the liquid discharge device 2. For example, FIG. 12 illustrates an example in which a resonance frequency f immediately after the discharge of droplets is obtained based on a temporal variation fx for each of three different solutions A, B, and C. In the example of FIG. 12, value fa is a resonance frequency f immediately after droplets of the solution A are discharged, value fb is a resonance frequency f immediately after droplets of the solution B are discharged, and value fc is a resonance frequency f immediately after droplets of the solution C are discharged.

As described above, the droplet dispensing apparatus 500 can measure the amount of droplets discharged from the liquid discharge device 2 with high accuracy by using a temporal resonance frequency change trend for a liquid based on measurements only during a period td in which a frequency measurement value has stabilized.

The present disclosure is not limited to the above-described examples. For example, a configuration in which the mass calculation unit 111, the liquid amount measurement control unit 112, and the time tracking unit 113 are included in the processor 11 was described, but the disclosure is not limited thereto. For example, a configuration may be adopted in which the QCM device 7 itself includes a processor performing functions and operations corresponding to the mass calculation unit 111, the liquid amount measurement control unit 112, and the time tracking unit 113. In such a configuration, the liquid amount measurement control unit 112 and the time tracking unit 113 would be connected to the processor 11.

In an above-described example, a configuration in which a mounting module 5 (having a liquid dropping device 2 mounted thereon) is provided in the Y-direction moving stand 65, and the liquid dropping device 2 is moved by controlling the X-direction moving stand motor 66 and the Y-direction moving stand motor 67 was described, but the disclosure is not limited thereto. For example, as in a second embodiment illustrated in FIGS. 13 and 14, a configuration in which the mounting module 5 is fixed and the microplate 4 and the QCM device 7 are moved may be adopted. A configuration of a droplet dispensing apparatus 500 according to the second embodiment is described by reference to FIGS. 13 and 14. In the configuration of the droplet dispensing apparatus 500 according to the second embodiment, the same components as those of the droplet dispensing apparatus 500 according to the first embodiment have the same reference symbols, and detailed description of such repeated components will be omitted.

In the second embodiment, a microplate 4 and a holding portion 71 and a crystal sensor 72 of a QCM device 7 are fixed to a flat plate-shaped Y-direction moving stand 65. A frame-shaped attachment member 41 to which the microplate 4 is detachably attached is provided in the Y-direction moving stand 65. The attachment member 41 may have the same configuration as that of the attachment member 31 of the droplet dispensing apparatus 500 according to the first embodiment.

A pair of right and left X-direction guide rails 61 extending in the X-direction are provided at both ends on a base 3. Both ends of the X-direction guide rails 61 are fixed to a pair of fixing stands 62 protruding on the base 3.

Two Y-direction guide rails 64 extending in the Y-direction are installed between the pair of X-direction guide rails 61. The two Y-direction guide rails 64 are disposed in parallel at an interval in the X-direction. Both ends of the two Y-direction guide rails 64 are respectively fixed to a pair of X-direction moving stands 63 that are slidable in the X-direction along the X-direction guide rails 61. These four X-direction moving stands 63 slide at the same time. That is, in the second embodiment, the Y-direction moving stand 65 is required to have an area in which the microplate 4 and the QCM device 7 can be fixed, and thus a plurality of Y-direction guide rails 64 are provided.

The Y-direction moving stand 65 is fixed to the two Y-direction guide rails 64. Thereby, the microplate 4 and the QCM device 7 are supported to be movable to any position in the X and Y directions by a combination of an operation of the Y-direction moving stand 65 moving in the Y-direction along the two Y-direction guide rails 64 and an operation of the X-direction moving stands 63 moving in the X-direction along the X-direction guide rails 61.

Figure 13:
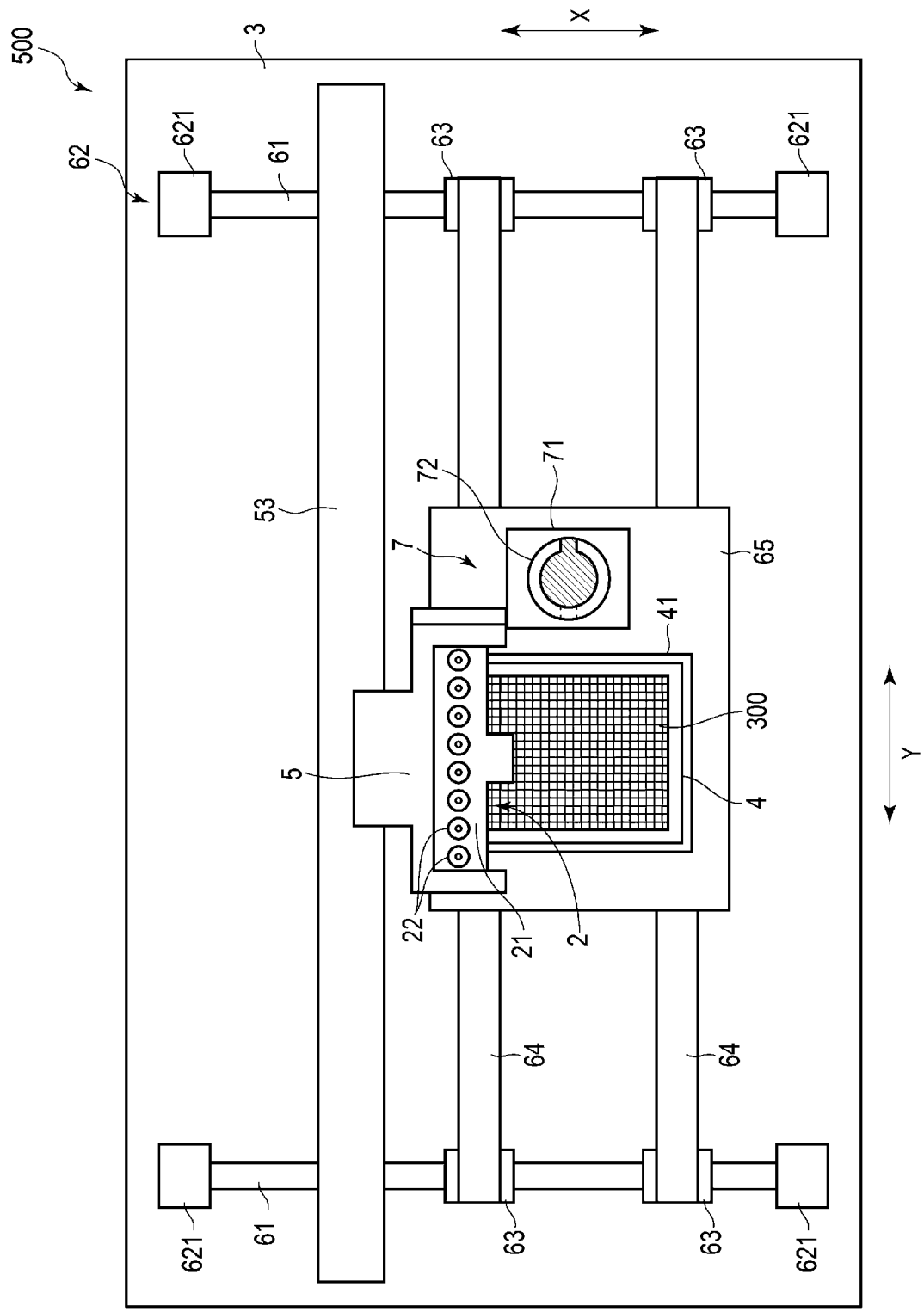
FIG. 13 is a plan view schematically illustrating a configuration of a droplet dispensing apparatus according to a second embodiment.
Figure 14:
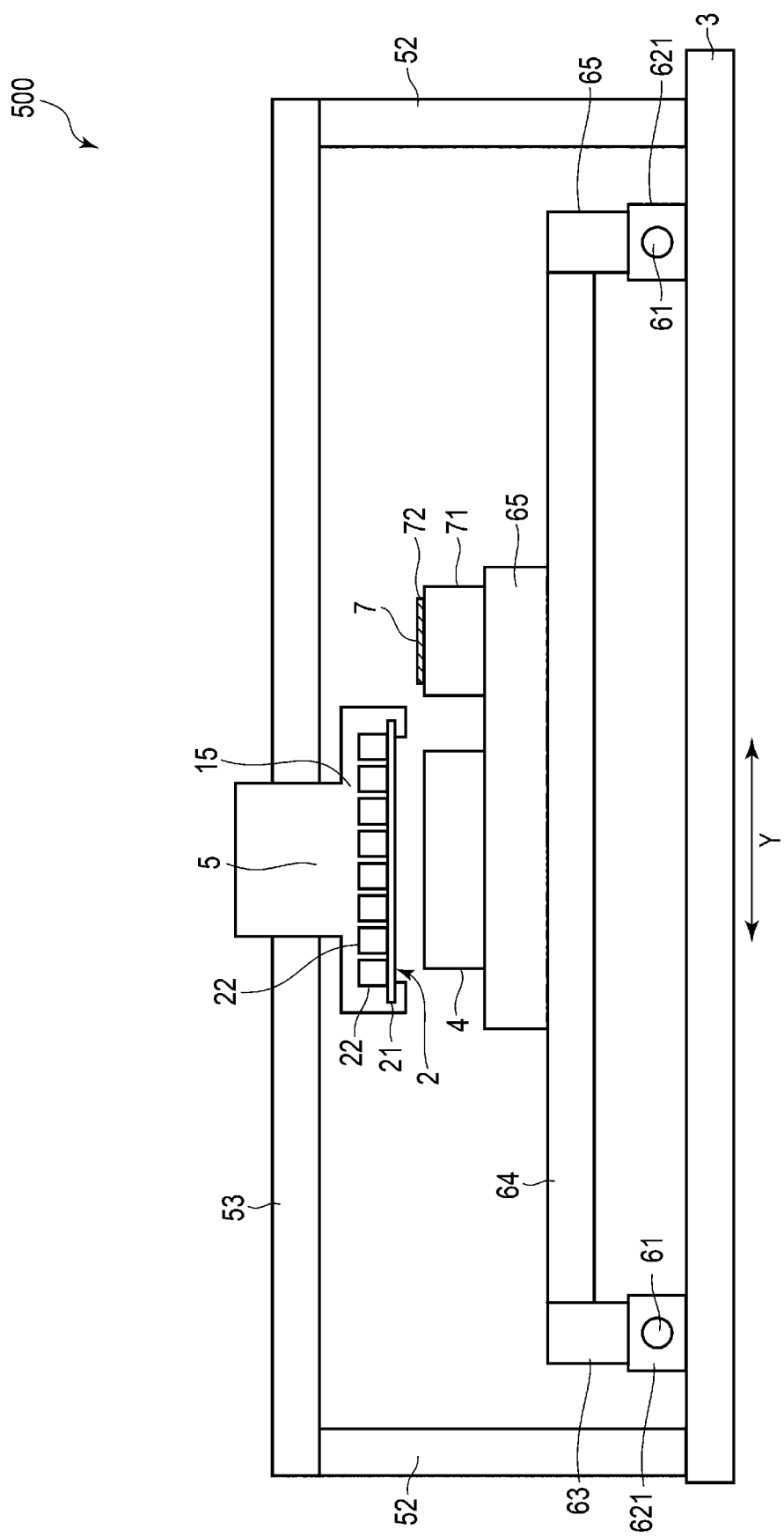
FIG. 14 is a side view schematically illustrating a configuration of a droplet dispensing apparatus according to a second embodiment.

The liquid dropping device 2 is mounted on the mounting module 5 at a position not interfering with a movement range of the Y-direction moving stand 65 is provided on the base 3. The mounting module 5 includes two columns 52 and one horizontal frame 53 extending in the Y-direction as illustrated in FIGS. 13 and 14. The two columns 52 are erected in a direction perpendicular to both ends of the base 3 in the Y-direction. The horizontal frame 53 is installed between upper ends of the two columns 52. The mounting module 5 is fixed at substantially the central position of the horizontal frame 53. The liquid discharge device 2 is fixed to the mounting module 5.

The droplet dispensing apparatus 500 according to the second embodiment is different from the droplet dispensing apparatus 500 according to the first embodiment in that the microplate 4 and the holding portion 71 and the crystal sensor 72 of the QCM device 7 are moved in association with the movement of the Y-direction moving stand 65, but the embodiments exhibit the same effects as each other. A vibration voltage generation unit 73 and a resonance frequency measuring unit 74 may be configured to be provided on the base 3, may be configured to be provided on the Y-direction moving stand 65, or may be configured to be installed at other locations.

Figure 15:
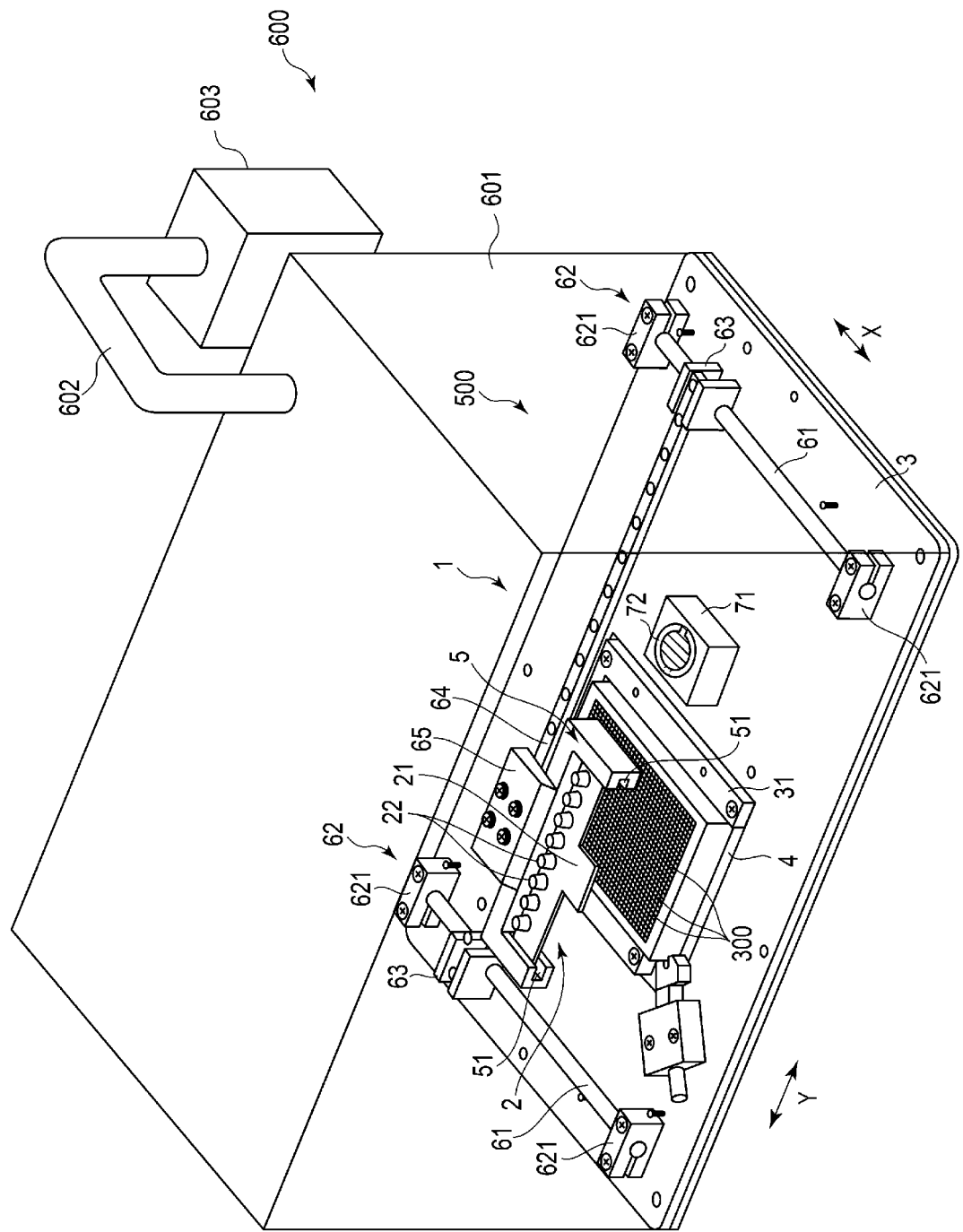
FIG. 15 is a perspective view schematically illustrating a configuration of a droplet dispensing apparatus according to a third embodiment.

The droplet dispensing apparatuses 500 according to the first and second embodiments may be configured to further include a humidity adjustment apparatus 600 that tracks and manages humidity around at least the crystal sensor 72 in order to track vaporization of a liquid adhered to the crystal sensor 72. As in the droplet dispensing apparatus 500 illustrated in FIG. 15, the humidity adjustment apparatus 600 includes, for example, a housing 601 that covers the liquid medicine discharge apparatus 1 and the liquid medicine dropping device 2, a duct 602 provided in the housing 601, and an air conditioner 603 connected to the duct 602. The humidity adjustment apparatus 600 adjusts humidity in the housing 601 by sending air having a known humidity level set by the air conditioner 603. More preferably, the air conditioner 603 manages temperature in addition to humidity. According to the droplet dispensing apparatus 500 including such a humidity adjustment apparatus 600, it is possible to obtain a temporal variation fx (or "temporal change tendency fx" or "resonance frequency trend") for resonance frequency of a liquid in a period td under the same humidity conditions. Thereby, vaporization conditions of a liquid at the time of measurement become the same even with changes in environmental humidity according to seasons, weather changes, and the like, and thus it is possible to more stably measure the amount of droplets dispensed from the liquid dropping device 2. In a humidity adjustment apparatus 600 that additionally manages temperature, changes in temperature are also prevented, and vaporization conditions of a liquid at the time of measurement can be set to be the same (or substantially so) conditions measurement.

A droplet dispensing apparatus 500 configured as described above can measure the amount of droplets discharged from the liquid dropping device with high accuracy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A droplet dispensing apparatus, comprising:
   a crystal sensor;
   a vibration voltage generation unit configured to apply a vibration voltage to the crystal sensor;
   a resonance frequency measuring unit configured to detect a resonance frequency of the crystal sensor; and
   a controller configured to:
   obtain the resonance frequency of the crystal sensor before droplets are discharged from a liquid dropping device,
   control the liquid dropping device to discharge a liquid as droplets on to the crystal sensor,
   obtain the resonance frequency of the crystal sensor on which droplets are adhered after the droplets are discharged from the liquid dropping device,
   estimate a volatilization amount for the droplets during a first period of time beginning when the droplets are adhered to the crystal sensor, the volatilization amount being estimated based on a temporal change trend in the resonance frequency of the crystal sensor measured for a second period of time after the first period of time, and
   calculate a weight of the droplets discharged from the liquid dropping device on to the crystal sensor based on the difference in resonance frequency of the crystal sensor before and after the droplets are discharged and the estimated volatilization amount.

2. The droplet dispensing apparatus according to claim 1, further comprising:
   a mounting portion on which the liquid dropping device can be mounted.

3. The droplet dispensing apparatus according to claim 1, further comprising:
   a base to which a well plate can be fixed to receive droplets from the liquid dropping device; and
   a sensor holder on the base configured to hold the crystal sensor, wherein
   the well plate and the holder are at different positions on the base.

4. The droplet dispensing apparatus according to claim 1, wherein the controller is configured to measure the resonance frequency multiple times during the second period of time and store the resonance frequencies measured during the second period of time in a storage unit.

5. The droplet dispensing apparatus according to claim 4, wherein the temporal change trend is calculated based the stored resonance frequencies measured during the second period of time.

6. The droplet dispensing apparatus according to claim 1, wherein the temporal change trend is calculated based on a plurality of resonance frequencies measured at different times during the second period of time.

7. The droplet dispensing apparatus according to claim 1, wherein the temporal change trend is calculated based only on the resonance frequency before droplets are discharged and a plurality of resonance frequencies measured at different times during the second period of time.

8. The droplet dispensing apparatus according to claim 1, wherein the crystal sensor is a quartz crystal microbalance sensor.

9. The droplet dispensing apparatus according to claim 1, wherein the crystal sensor comprises a quartz crystal with electrodes formed thereon, the electrodes being connected to the vibration voltage generation unit.

10. The droplet dispensing apparatus according to claim 1, further comprising:
a humidity control apparatus configured to control humidity around the crystal sensor to be a substantially fixed level.

11. The droplet dispensing apparatus according to claim 1, further comprising:
a housing enclosing the crystal sensor and the liquid discharge device.

12. The droplet dispensing apparatus according to claim 11, further comprising:
an air conditioner unit connected to the housing and configured to control a humidity level inside the housing to be a substantially constant level.

13. The droplet dispensing apparatus according to claim 12, wherein the air conditioner unit is further configured to control a temperature level inside the housing to be a substantially constant level.

14. A droplet dispensing apparatus with self-calibration function, the droplet dispensing apparatus comprising:
a base plate;
a wellplate mount on the base plate at a first position;
a sensor holder on the base plate at a second position spaced from the first position and configured to hold a crystal sensor;
a moveable liquid dropping device mount configured to move a liquid dropping device to the first position and the second position to discharge a liquid as droplets at the first position and the second position;
a vibration voltage generation unit configured to apply a vibration voltage to the crystal sensor;
a resonance frequency measuring unit configured to detect a resonance frequency of the crystal sensor; and
a controller configured to:
obtain the measured resonance frequency of the crystal sensor before droplets are discharged from the liquid dropping device,
control the liquid dropping device to discharge droplets on to the crystal sensor,
obtain the measured resonance frequency of the crystal sensor on which droplets are adhered after the droplets are discharged from the liquid dropping device,
estimate a volatilization amount for the droplets during a first period of time beginning when the droplets are adhered to the crystal sensor, the volatilization amount being estimated based on a temporal change trend in the resonance frequency of the crystal sensor measured for a second period of time after the first period of time, and
calculate a weight of the droplets discharged from the liquid dropping device on to the crystal sensor based on the difference in resonance frequency of the crystal sensor before and after the droplets are discharged and the estimated volatilization amount.

15. The droplet dispensing apparatus according to claim 14, wherein the controller is configured to measure the resonance frequency multiple times during the second period of time and store the resonance frequencies measured during the second period of time in a storage unit.

16. The droplet dispensing apparatus according to claim 14, wherein the temporal change trend is calculated based on a plurality of resonance frequencies measured at different times during the second period of time.

17. The droplet dispensing apparatus according to claim 14, further comprising:
a humidity control apparatus configured to control humidity around the crystal sensor to be a substantially fixed level.

18. The droplet dispensing apparatus according to claim 14, further comprising:
a housing enclosing the crystal sensor holder and the moveable liquid dropping device mount.

19. The droplet dispensing apparatus according to claim 18, further comprising:
an air conditioner unit connected to the housing and configured to control a humidity level inside the housing to be a substantially constant level.

20. The droplet dispensing apparatus according to claim 19, wherein the air conditioner unit is further configured to control a temperature level inside the housing to be a substantially constant level.

* * * * *